(12) United States Patent
Caine

(10) Patent No.: US 8,793,986 B2
(45) Date of Patent: Aug. 5, 2014

(54) COMBINED CABIN HEATER AND EGR HEAT EXCHANGER

(75) Inventor: Jonathan Edward Caine, South Woodham Ferrers (GB)

(73) Assignee: Ford Global Technologies, LLC, Dearborn, MI (US)

( * ) Notice: Subject to any disclaimer, the term of this patent is extended or adjusted under 35 U.S.C. 154(b) by 193 days.

(21) Appl. No.: 13/351,994

(22) Filed: Jan. 17, 2012

(65) Prior Publication Data
US 2012/0180452 A1  Jul. 19, 2012

(30) Foreign Application Priority Data
Jan. 17, 2011 (GB) .................................. 1100724.2

(51) Int. Cl.
| | | |
|---|---|---|
| *F01N 3/00* | (2006.01) | |
| *F01N 3/10* | (2006.01) | |
| *F01N 3/02* | (2006.01) | |
| *F01N 5/02* | (2006.01) | |
| *F01N 1/00* | (2006.01) | |
| *F02M 25/06* | (2006.01) | |
| *F02M 25/07* | (2006.01) | |
| *F02B 47/08* | (2006.01) | |
| *F28F 27/00* | (2006.01) | |
| *F28F 27/02* | (2006.01) | |
| *F28F 1/30* | (2006.01) | |
| *F28D 9/00* | (2006.01) | |

(52) U.S. Cl.
CPC ........... *F28D 9/0012* (2013.01); *F01N 2240/02* (2013.01); *F02M 25/0717* (2013.01); *F02M 25/0729* (2013.01); *F02M 25/0734* (2013.01); *F02M 25/0735* (2013.01); *F02M 25/0737* (2013.01); *F28D 9/0031* (2013.01)
USPC ................... 60/320; 60/278; 60/298; 60/299; 60/324; 123/568.12; 165/96; 165/103; 165/182

(58) Field of Classification Search
USPC ................... 60/278, 286, 298, 299, 320, 324; 123/568.12; 165/42, 96, 103, 181, 182, 165/231
See application file for complete search history.

(56) References Cited

U.S. PATENT DOCUMENTS

| | | | |
|---|---|---|---|
| 6,155,042 A | 12/2000 | Perset et al. | |
| 2009/0038302 A1* | 2/2009 | Yamada et al. ................. | 60/320 |
| 2010/0251702 A1* | 10/2010 | Shikazono et al. ............. | 60/320 |
| 2011/0067389 A1* | 3/2011 | Prior et al. ...................... | 60/320 |

FOREIGN PATENT DOCUMENTS

| | | |
|---|---|---|
| DE | 3801910 A1 | 8/1988 |
| DE | 102008004133 A1 | 7/2009 |
| GB | 2428603 A | 2/2007 |

* cited by examiner

*Primary Examiner* — Audrey K Bradley
(74) *Attorney, Agent, or Firm* — Julia Voutyras; Alleman Hall McCoy Russell & Tuttle LLP

(57) ABSTRACT

A combined emission control device and exhaust gas heat exchanger for connection to the exhaust gas flow from an engine of a motor vehicle is disclosed having a number of exhaust gas transfer passages and a number of coolant passages so as to permit heat to be transferred from exhaust gas flowing through the exhaust gas heat exchanger to coolant used to supply heating for a cabin of the motor vehicle. The exhaust gas heat exchanger includes a tapping to permit cooled exhaust gas to be extracted for use in a Low Pressure Exhaust Gas Recirculation system. The exhaust gas heat exchanger thereby provides dual functionality being able to recuperate heat for use in a cabin heater and cool exhaust gas for use in the Low Pressure Exhaust Gas Recirculation system.

8 Claims, 9 Drawing Sheets

COMBINED CABIN HEATER AND EGR HEAT EXCHANGER

RELATED APPLICATIONS

The present application claims priority to United Kingdom Patent Application No. 1100724.2, filed on Jan. 17, 2011, the entire contents of which are hereby incorporated by reference for all purposes.

FIELD

This disclosure relates to heat exchangers and in particular to an exhaust gas heat exchanger for an internal combustion engine.

BACKGROUND AND SUMMARY

There is an increasing demand in the automobile industry to provide fuel economy and emissions at an affordable cost whilst maintaining customer performance. This is felt very strongly with cabin heater performance where, due to the demand for very high fuel economy from the engine, there is no waste heat left for transfer to the engine coolant for use in a cabin heater. As a consequence auxiliary heaters are being fitted to vehicles. Currently the main type of auxiliary heater is a supplementary electric heater which, while effective in providing customer comfort, does so at a reasonably high cost and poor fuel economy.

To reduce emission from an engine one or more emission control devices such as a catalytic converter may be used to reduce the emissions from the engine. Further, a heat exchanger may be used to cool exhaust gas downstream of a catalyst system and introduce this cooled exhaust gas into the engine before the compressor side of a turbocharged engine. This system is referred to as a Tow Pressure exhaust gas recirculation' and has the advantage of lower emissions and fuel economy than a conventional exhaust gas recirculation (EGR) system. One disadvantage of such a low pressure system is the increased cost associated with the additional heat exchangers, pipework and valves.

One example of a low pressure exhaust gas recirculation system is shown in FIG. 1B. An internal combustion engine 105 has an exhaust manifold 106 to which is connected an exhaust pipe 107u leading to a turbine 81 of a turbocharger for the engine 105. Exhaust gas flows through the turbine into an emission control device 112 such as a catalytic converter and then out via an exhaust pipe 107d. A throttle valve 153 is used to control the flow of air entering the compressor 80. The emission control device 112 is used to reduce the emissions passing out from the engine 105 into the atmosphere via the exhaust pipe 107d.

A low pressure exhaust gas recirculation system 150 includes an exhaust gas heat exchanger 111 to selectively cool any exhaust gas passing through a conduit 151 of the system 150. The low pressure exhaust gas recirculation system 150 recirculates exhaust gas from a position downstream of the catalyst 112 to a compressor 80 of the turbocharger. A valve 152 of the low pressure exhaust gas recirculation system 150 is provided downstream of the exhaust gas heat exchanger 111 to control the volume of exhaust gas flowing through the exhaust gas heat exchanger 111 or through a bypass passage 113. An exhaust gas recirculation control valve 84 controls the flow of recirculating exhaust gas through the exhaust gas recirculation system 150.

The exhaust gas exiting the compressor 80 passes through an intercooler 83 before entering the engine 105 via an inlet manifold 103.

There are a number of disadvantages with such a system, firstly the arrangement of the exhaust gas heat exchanger 111 and bypass passage 113 are expensive to produce and are difficult to package in the confined space of a modern motor vehicle. Secondly, at certain periods during the operating cycle of the engine 105, such as warm-up from cold, the exhaust gas flowing through the exhaust gas heat exchanger 111 will cause condensation to form in the exhaust gas heat exchanger 111. If this condensate builds up in the exhaust gas heat exchanger 111 there is the possibility that some of it will be dragged by the fast flowing exhaust gas through the conduit joining the catalyst 112 to the compressor 80 thereby risking the ingestion of condensation droplets by the compressor 80. Such ingestion is disadvantageous as it can result in damage to the compressor 80 or to the engine 105. Also the impingement of water droplets in the form of the entrained condensate against the blades of the compressor is likely to reduce its service life even if instantaneous damage does not occur. It is unlikely that any condensate collected in the cooler 111 can flow into the exhaust pipe 107d thereby allowing it to be harmlessly disposed of because such a flow is against the general flow through the low pressure exhaust gas recirculation system.

It is an object of this disclosure to provide a heat exchanger that is of a compact design and is economical to manufacture that can recuperate waste heat for use in heating a cabin of a motor vehicle while also providing cooled exhaust gas for use in a Low Pressure Exhaust Gas Recirculation system.

According to the present disclosure there is provided a combined cabin heater and low pressure exhaust gas recirculation heat exchanger for a motor vehicle comprising an exhaust gas inlet, a coolant inlet connected to a supply of coolant, a coolant outlet connected to a vehicle system, an exhaust gas tapping connected to at least one exhaust gas transfer passage within the heat exchange for supplying exhaust gas to a low pressure exhaust gas recirculation system, and an exhaust gas control valve to vary the flow of exhaust gas through the heat exchange unit. The combined cabin heater and low pressure exhaust gas recirculation heat exchanger may be provided within a combined emissions control device and heat exchanger assembly that has an exhaust gas inlet, receiving exhaust gas from an engine of the motor vehicle, and an exhaust gas outlet connected to the heat exchange unit directing exhaust gas flow to atmosphere.

The present disclosure will now be described by way of example with reference to the accompanying figures.

DETAILED DESCRIPTION

Figure 1A:
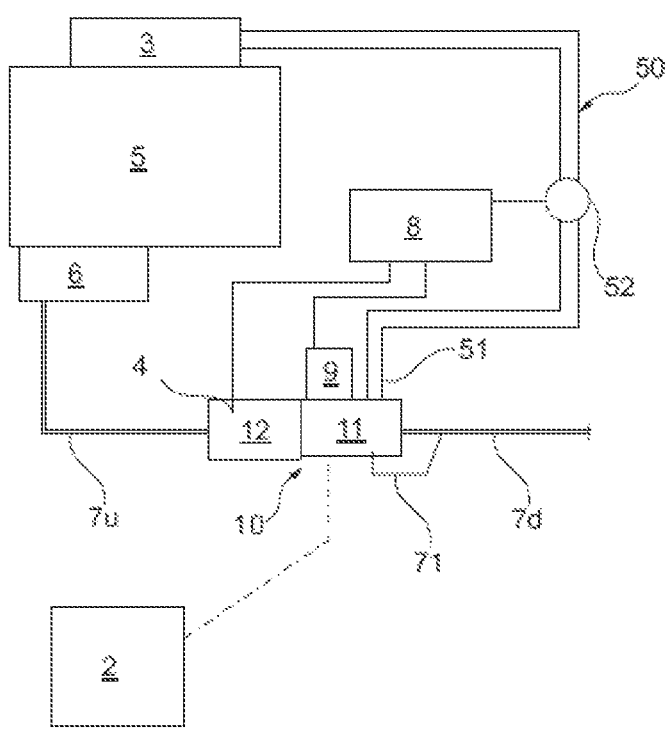
FIG. 1A shows an internal combustion engine system having a combined emission control device and exhaust gas heat exchanger forming part of a Low Pressure Exhaust Gas Recirculation System according to the disclosure.
Figure 1B:
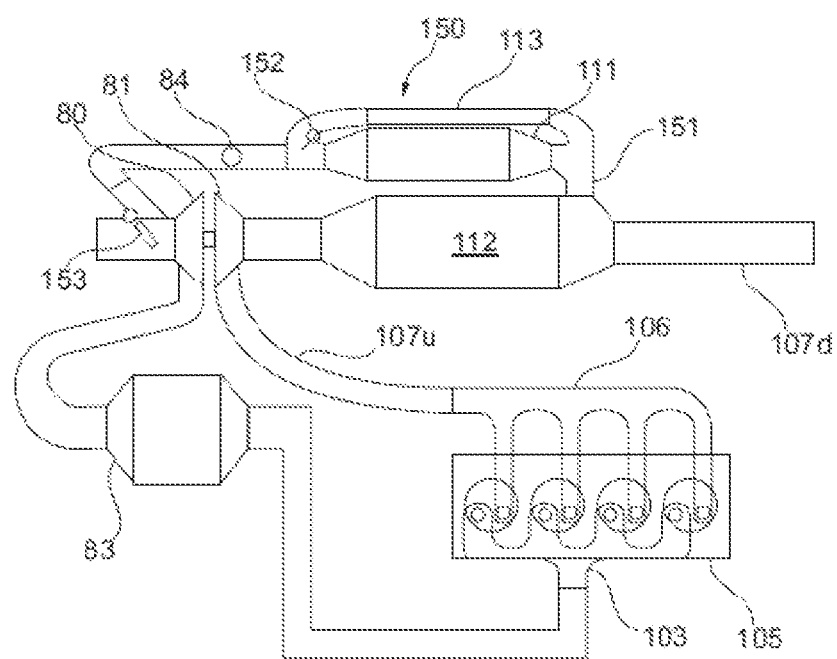
FIG. 1B shows an engine having a Low Pressure Exhaust Gas Recirculation system.

With particular reference to FIG. 1A there is shown an internal combustion engine 5 having an exhaust manifold 6 to which is connected an exhaust pipe 7u leading to an exhaust gas inlet 13 (not shown in FIG. 1A) to a combined emission control device and low pressure exhaust gas recirculation heat exchanger assembly 10.

The combined emission control device and cooler assembly 10 comprises an emission control device, such as a catalytic converter, 12 and a heat exchanger in the form of an exhaust gas heat exchanger 11 positioned downstream from the emission control device 12. The emission control device 12 is connected to the exhaust gas inlet 13 so that it may receive exhaust gas from engine 5. The exhaust gas heat exchanger 11 extracts heat from the exhaust gas passing through it which may be used to heat a cabin of a motor vehicle by a cabin heater 2 in the form of a coolant to air heat exchanger.

A second exhaust pipe 7d transfers exhaust gas from an outlet of tube 15 (not shown in FIG. 1A) of the exhaust gas heat exchanger 11 to the atmosphere.

The exhaust gas heat exchanger 11 includes a butterfly valve 25 (not shown on FIG. 1A) which is moveable between a direct flow position in which exhaust gas passes directly through the exhaust gas heat exchanger 11 with no appreciable cooling and a transfer position in which all of the exhaust gas is cooled as will be described in more detail hereinafter. The butterfly valve 25 is rotated by an actuator mechanism including an electronically controlled actuator 9. The control of the butterfly valve 25 could alternatively be done using a wax based thermostatic control of the butterfly valve 25.

The electronically controlled actuator 9 is operably connected to an electronic control unit 8 which controls the positioning of the butterfly valve 25. A temperature sensor 4 is positioned at or near to an inlet to the emission control device 12 so as to measure the temperature of the exhaust gas entering the emission control device 12 and provides a signal indicative of the sensed temperature to the electronic control unit 8.

A low pressure exhaust gas recirculation system (LPEGR system) 50 is connected between the exhaust gas heat exchanger 11 and an inlet manifold 3 of the engine 5 to recirculate cooled exhaust gasses back into the engine 5. The LPEGR system comprises of a conduit 51 which is connected at one end to the exhaust gas heat exchanger 11 and is connected at an opposite end to the inlet manifold 3 and an exhaust gas recirculation valve 52. Flow through the conduit 51 is controlled by the exhaust gas recirculation control valve 52 in response to commands from the electronic control unit 8.

The exhaust gas heat exchanger 11 is also provided with a condensate drainage element in the form of a pipe 71 that extends from a position on the bottom of the exhaust gas heat exchanger 11 to a location downstream of the exhaust gas heat exchanger 11 where it is connected to the second exhaust pipe 7d. During operation of the engine 5 any condensation that develops in the exhaust gas heat exchanger 11 is drained through the pipe 71 due a pressure differential that occurs between the position of connection of the pipe 71 to the exhaust gas heat exchanger 11 and the position where it is connected to the second exhaust pipe 7d.

It will be appreciated that in the case of a turbocharged engine the exhaust gas recirculation conduit will supply exhaust gas to a position upstream of a compressor of the turbocharger. A turbocharger is not shown on FIG. 1A but the compressor would be situated in the conduit run between the exhaust gas control valve 52 and the inlet manifold 3. It will also be appreciated that a charge cooler would also be used in the case of a turbocharged engine located in the air supply line to the engine.

The electronic control unit 8 controls the positioning of the butterfly valve 25 based upon the signal received from the temperature sensor 4 and controls the opening and closing of the exhaust gas recirculation valve 52 based upon inputs (not shown) relating to the operating state of the engine 5. Such inputs may include, for example and without limitation, engine speed, engine load, inlet gas mass flow rate, exhaust gas temperature, coolant temperature.

In an exemplary form of operation the electronic control unit 8 is operable to control the electronically controlled actuator 9 to move the butterfly valve 25 to the direct flow position when cabin heating is not required and move it to a full flow diverted position when cabin heating is required.

With particular reference to FIGS. 2 to 8, drawn to scale, the combined emission control device and exhaust gas cooler assembly 10 is shown in greater detail.

Figure 2:
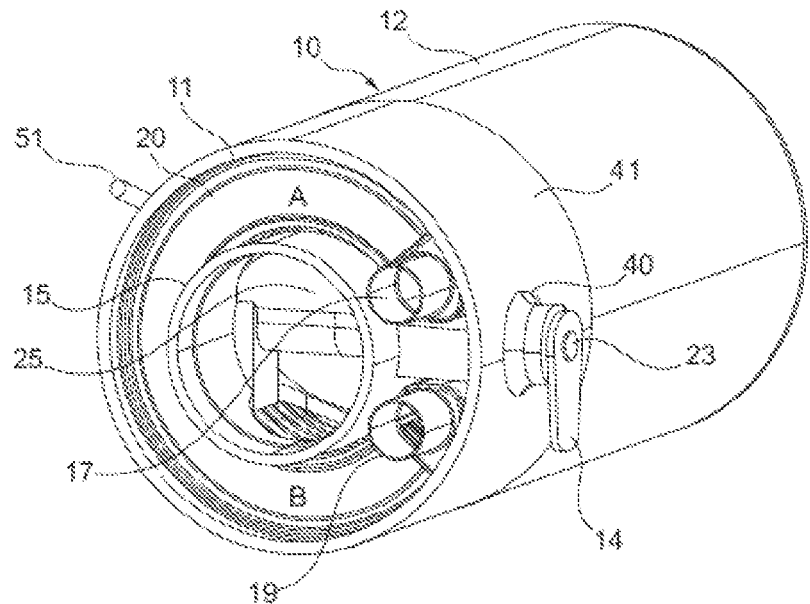
FIG. 2 is a pictorial end view of a combined emission control device and exhaust gas heat exchanger shown in FIG. 1.
Figure 3:
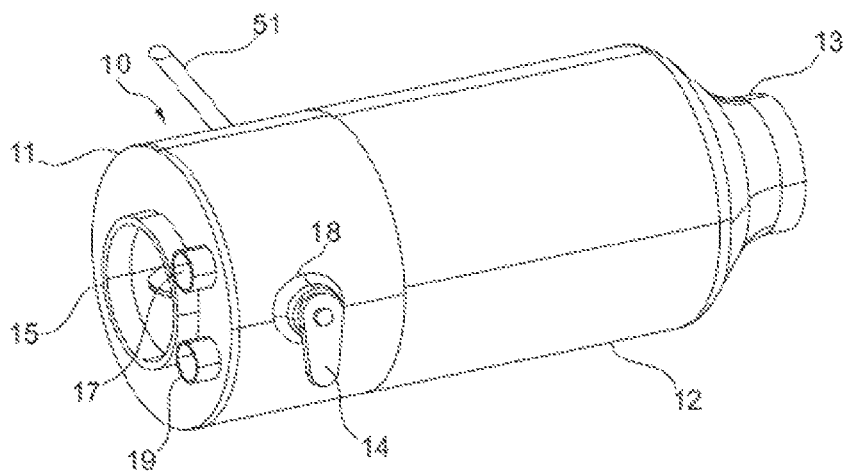
FIG. 3 is a pictorial side view of a combined emission control device and exhaust gas heat exchanger shown in FIG. 1
Figure 4:
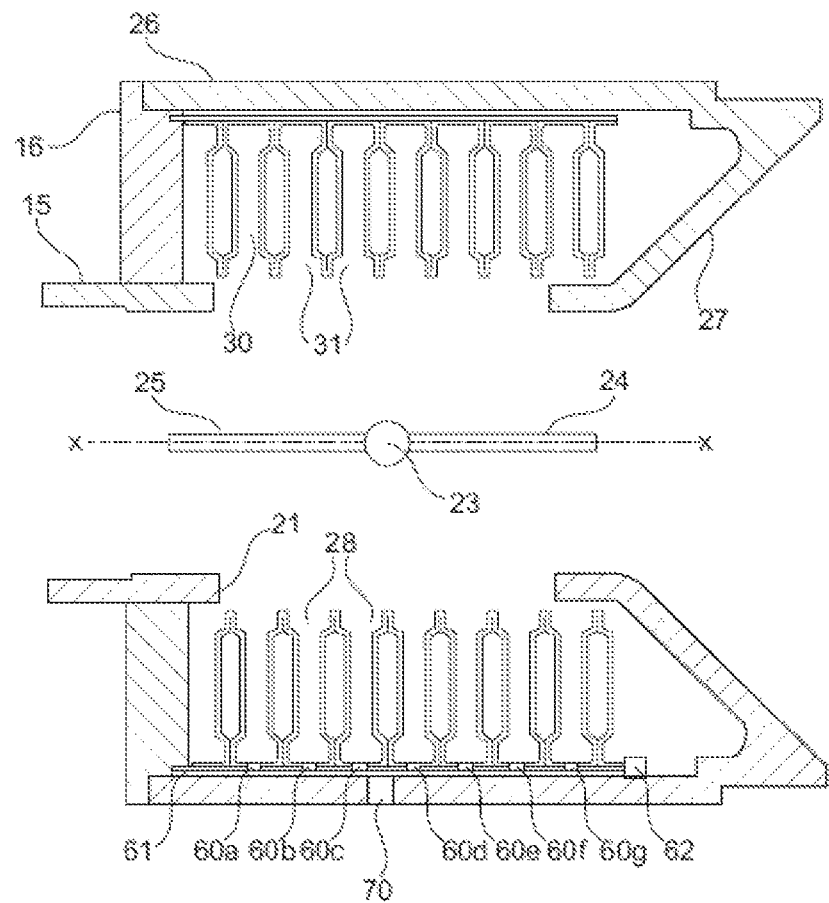
FIG. 4 is a cross-section through an exhaust gas heat exchanger forming part of the combined emission control device and exhaust gas heat exchanger shown in FIGS. 2 and 3 showing a butterfly valve in a direct flow position.
Figure 5:
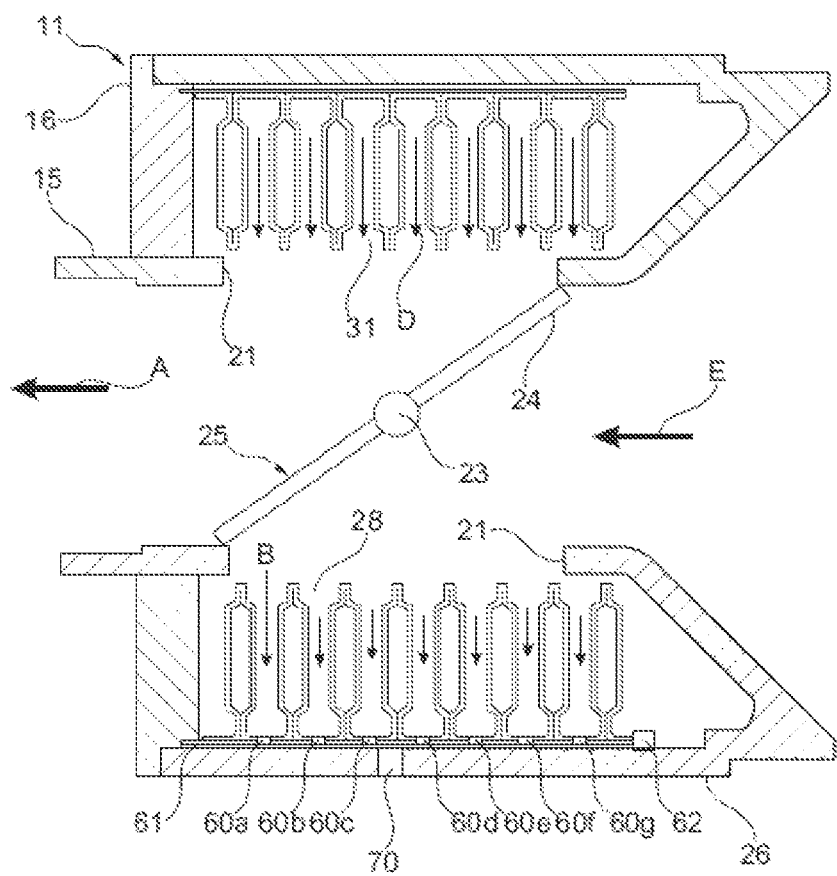
FIG. 5 is a cross-section similar to FIG. 4 but showing the butterfly valve in a full exhaust gas transfer position.

As depicted in FIGS. 4 and 5, the combined emission control device and exhaust gas heat exchanger assembly 10 has a cast cylindrical outer body 26 which is connected to a longitudinally extending central cylindrical tube 15 which forms an outlet from the exhaust gas heat exchanger 11. The central cylindrical tube 15 and an inlet 27 are both formed as an integral part with the body 26 and an end cap 16 is fastened to one end of the cylindrical body 26 and to the cylindrical tube 15 so as to form an enclosure for a C-shaped heat exchange unit. The cylindrical tube 15 defines a substantially cylindrical central flow passage extending through the exhaust gas heat exchanger 11 and the butterfly valve 25 is rotatably mounted in the central flow passage. The final catalytic converter 12 is connected, as shown in FIGS. 2 and 3, to the exhaust gas heat exchanger 11 so as to supply exhaust gas thereto via the inlet 27.

An end portion of the cylindrical tube 15 forms an outlet, that is to say, exhaust gas exits the combined emission control device and exhaust gas heat exchanger assembly 10 through a free end of the cylindrical tube 15 into the second exhaust pipe 7d (shown in FIG. 1A).

Exhaust gas can selectively enter and leave the C-shaped heat exchange unit through two apertures 21 or ports formed in the cylindrical tube 15 positioned between the end cap 16 and the inlet 27. The apertures 21 form inlet and outlet ports for the heat exchange unit.

The C-shaped heat exchange unit is formed by a plurality of C-shaped plates 20 which are stacked together to define a plurality of exhaust gas transfer passages 30 and a plurality of coolant flow passages 32.

The C-shaped heat exchange unit defines a substantially cylindrical central flow passage formed within the inner diameter of C-shaped plates 20, extending through the exhaust gas heat exchanger 11 and the butterfly valve 25 is rotatably mounted in the central flow passage. The central flow passage extends along a longitudinal axis X-X as shown on FIG. 4.

The butterfly valve 25 has a shaft or spindle 23 supported by a bearing (not shown) located in a boss 18 formed on the body 26. The spindle 23 extends from the bearing to a head 24 of the butterfly valve 25 through a gap formed between a coolant inlet plenum 41 and a coolant outlet plenum 40 so as to minimise the temperature of the bearing. A lever 14 is attached to one end of the spindle 23 for use in connecting the spindle 23 to the electronically controlled actuator 9.

The coolant inlet plenum 41 has an inlet formed by a tube 17 which is connected in use to a source of coolant such as a cooling circuit of the engine 5 and the coolant outlet plenum 40 has an outlet formed by a tube 19 used to connect the coolant outlet plenum 40 to the cabin heater 2 before returning coolant to the source from which the coolant is derived. In use coolant enters the coolant inlet plenum 41 through the tube 17 and flows from the coolant inlet plenum 41 through all of the coolant flow passages 32 in parallel to the coolant outlet plenum 40 and then to the cabin heater 2 via the tube 19.

The construction of the C-shaped heat exchange unit will now be described in more detail.

The C-shaped heat exchange unit comprises of a stack of identical C-shaped plates 20. Each of the plates has a front surface in which is formed a depression 33 between in and outer circumferentially extending flanges 34, 36 and a rear surface from which extends a lip 35 around the outer periphery of each plate 20.

The plates 20 are secured together in parallel by brazing in pairs such that their respective front surfaces face one another so as to define therebetween a coolant flow passage 32. That is to say the inner and outer circumferentially extending flanges 34, 36 abut one another and are brazed together and the two depressions 33 form in combination a single coolant flow passage 32 defined by the combined depth of the two depressions 33. The pairs of plates 20 are stacked one against another in parallel so that the rear surface of one plate 20 of one pair faces the rear surface of one plate 20 of an adjacent pair so as to define therebetween an exhaust gas transfer passage 30. The two lips 35 abut against one another when the two pairs of plates abut one another and are brazed together to prevent exhaust gas leakage. The height of the lips 35 on the two abutting plates 20 is such that they act as a spacer separating the two rear surfaces to form an exhaust gas transfer passage 30 between the two adjacent rear surfaces defined by the combined height of the lips of the two rear surfaces. Such a stacked plate construction provides a heat exchange unit that is very compact and cost effective to manufacture and, in particular, the axial length of the heat exchange unit is relatively small.

Each of the exhaust gas transfer passages 30 has a gas inlet 28 and a gas outlet 31. The distance of the gas inlet 28 from the inlet port 21 for each of the exhaust gas transfer passages 30 is the same as the distance of the gas outlet 31 from the inlet port 21 so that there is substantially no pressure difference between the gas inlet 28 and the gas outlet 31 when the butterfly valve 25 is in the direct flow position. Therefore, no exhaust gas will flow through the exhaust gas transfer passages 30 when the butterfly valve 25 is in the direct flow position if the exhaust gas recirculation valve 52 is closed but there will be a small flow of exhaust gas through the exhaust gas heat exchanger 11 if the exhaust gas recirculation valve 52 is open. That is to say, irrespective of the position of the exhaust gas control valve, the exhaust gas supplied to the low pressure exhaust gas recirculation system may pass through at least part of the heat exchange unit. Note that in this case, the exhaust gas will flow from both of the regions "A" and "B" shown on FIG. 2. That is to say, from both of the ports 21 in the tube 15 to the conduit 51. This is because the position from which exhaust gas is drawn off for the exhaust gas recirculation system 50 is located halfway between the two ports 21 and, with the butterfly valve 25 in the direct flow position, there is no pressure difference between the two ports 21.

Therefore when the butterfly valve 25 is rotated such that it is in the direct flow position, exhaust gas can flow through the exhaust gas heat exchanger 11 or more specifically through the exhaust gas transfer passages 30 of the C-shaped heat exchange unit thereby being cooled as heat is exchanged from the exhaust gas to the coolant. However, the amount of flow is relatively low and so no significant heating of the coolant will occur and the exhaust gas heat exchanger 11 will not become thermally overloaded when the engine 5 is running at high load and speed.

When the butterfly valve 25 is rotated to a full flow diverting position as shown in FIG. 5, more exhaust gas flows through the exhaust gas heat transfer passages 30 and this provides a significant heating effect to the coolant flowing through the coolant flow passages 32 thereby recuperating heat from the exhaust gas that would otherwise have been wasted.

This flow diverting position is advantageous during engine start-up from cold as it provides an immediate source of heat to heat the coolant passing to the cabin heater 2. As can be seen with reference to FIG. 8 (in which one plate 20 is shown) each of the plates 20 is fastened to the inlet and outlet plenums 41, 40 by brazing so as to form a fluid tight seal between the plenums 40, 41 and the coolant flow passages 32.

Figure 6:
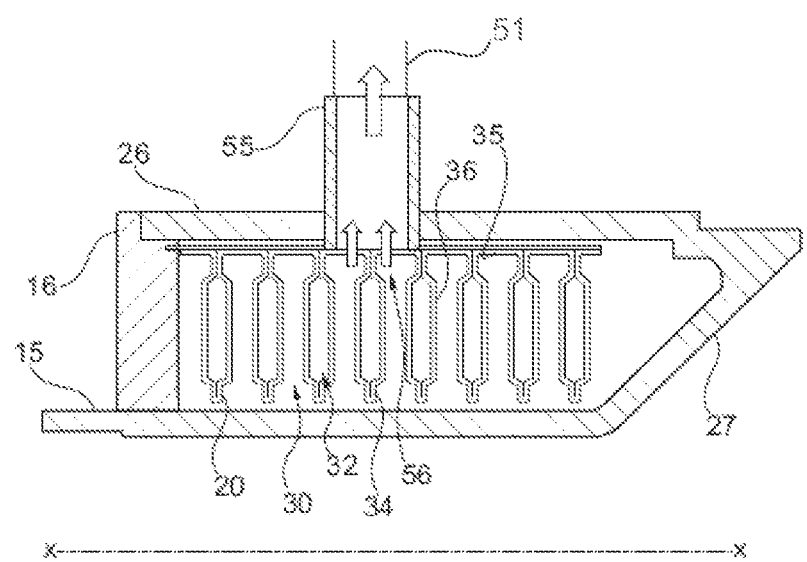
FIG. 6 is a view similar to FIG. 4 but showing half of the exhaust gas heat exchanger in a region where a tapping for a Low Pressure Exhaust Gas Recirculation supply is connected to the exhaust gas heat exchanger.
Figure 7:
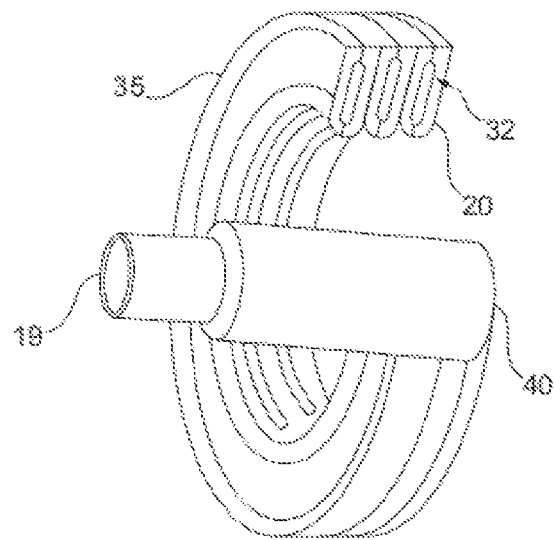
FIG. 7 is a pictorial side view of the exhaust gas heat exchanger shown in FIGS. 4 and 5 in a partially assembled state showing a coolant outlet plenum.
Figure 8:
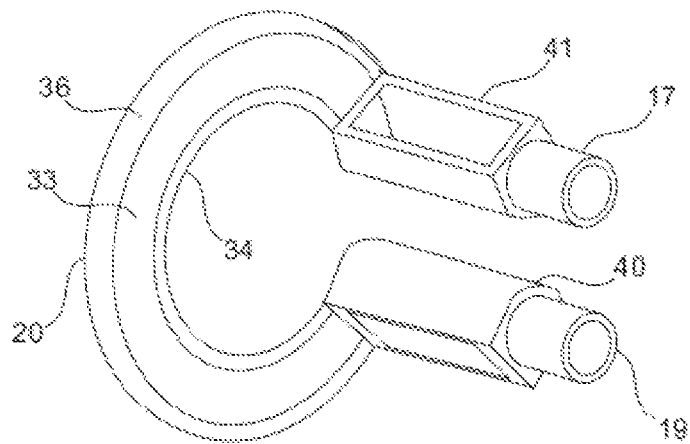
FIG. 8 is a pictorial side view of the exhaust gas heat exchanger shown in FIGS. 4 and 5 in a partially assembled state showing the coolant outlet plenum and a coolant inlet plenum.

As shown in FIG. 6, the exhaust gas recirculation conduit 51 is attached to an exhaust gas tapping 55 that is fastened to the cylindrical body 26 by welding. The tapping 55 connects to, in this case, two of the exhaust gas transfer passages 30 at a position mid-way between the two inlets 21, but may be connected to any number of exhaust gas transfer passages 30. The tapping 55 defines an outlet port 56 through which exhaust gas can selectively flow to a low pressure exhaust gas recirculation system when exhaust recirculation is required. As previously referred to, the positioning of the tapping 55 mid-way between the two inlets 21 divides the C-shaped heat exchange unit into two exhaust gas heat exchanger units labeled "A" and "B" on FIG. 2.

It will be appreciated that during certain stages of operation the flow of the hot exhaust gas when it comes into contact with the plates 20 will cause water to condense out of the exhaust gasses. As previously described, such condensate is very undesirable in that it can cause damage to the engine 5 if it is drawn back into the engine 5 via the LPEGR system 50. Therefore provision is made for the condensate to automatically drain away thereby reducing the risk of engine damage in the form of a condensate collection element that collects condensation produced in the heat exchange unit 11. It will also be appreciated that the risk of damage is intensified if a turbocharger is used because any entrained water droplets entering the compressor are likely to damage the blades of the compressor or at least reduce its working life.

As seen in FIGS. 4 and 5 the drainage element comprises of a number of small holes 60a, 60b, 60c, 60d, 60e, 60f and 60g which connect the exhaust gas transfer passages 30 to a condensate collection chamber 61 interposed between an outer periphery of the plates 20 and the cylindrical body 26. A seal 62 closes off one end of the collection chamber 61 and the end cap 16 closes of the other end so as to prevent condensate escaping into the main volume of the exhaust gas heat exchanger 11.

An outlet aperture 70 is formed in the cylindrical body 26 though which condensate can flow from the collection chamber 61 into a pipe or conduit such as the pipe 71 shown on FIG. 1A. The small holes 60a, 60b, 60c, 60d, 60e, 60f and 60g and the outlet aperture 70 are located at positions that lie on an underside of the exhaust gas heat exchanger 11 when the exhaust gas heat exchanger 11 is in use. This ensures that gravity can assist with the drainage of condensate from the exhaust gas transfer passages 30 to the collection chamber 61 and from there into the pipe 71.

Operation of the exhaust gas heat exchanger 11 is understood with reference to FIGS. 4 and 5.

FIG. 4 shows the butterfly valve 25 in the direct flow position. In this position the butterfly valve 25 is aligned with the exhaust gas flow entering the exhaust gas heat exchanger 11 and produces virtually no resistance to flow. Therefore, when the butterfly valve 25 is in this position, the exhaust gas enters the exhaust gas heat exchanger 11 through the inlet 27 and flows through the exhaust gas heat exchanger 11 with no appreciable cooling if the exhaust gas recirculation valve 52 is closed and with minimal cooling if the exhaust gas recirculation valve 52 is open. That is to say, when the exhaust gas control valve is in a direct flow position, substantially all of the exhaust gas may flow directly from the exhaust gas inlet 27 to the exhaust gas outlet of tube 15 with little or no interaction with the exhaust transfer passages 30 of the heat exchange unit 11. It will be appreciated that it is the exhaust gas that flows through the exhaust gas transfer passages 30 that is cooled and so the majority of the exhaust gas flows from the inlet 27 to the outlet of tube 15 without cooling. The exhaust gas flowing to the LPEGR system 50 will however be cooled because it flows from the regions "A" and "B" through the exhaust gas transfer passages 30 to the conduit 51 via the outlet port 56 defined by the tapping 55.

If it is desired to increase the temperature of the coolant flowing to the cabin heater 2 the butterfly valve 25 is rotated (in this case in an anti-clockwise direction) so that it is no longer aligned with the flow of exhaust gas entering the exhaust gas heat exchanger 11. The effect of this rotation is to produce a pressure differential between each gas inlet 28 and the corresponding gas outlet 31 thereby causing exhaust gas to begin flowing through the exhaust gas transfer passages 30 from the gas inlets 28 to the gas outlets 31. As exhaust gas passes through each of the exhaust gas transfer passages 30 it passes over the plates 20 defining the exhaust gas transfer passage 30 which transfers heat from the hot exhaust gas to the coolant flowing through the coolant flow passages 32. The exhaust gas is therefore cooled as it moves from the gas inlet 28 to the gas outlet 31 but the coolant is heated.

The percentage of exhaust gas that passes through the exhaust gas transfer passages 30 depends upon the angle of the butterfly valve 25 to the direction of the exhaust gas entering the exhaust gas heat exchanger 11 or more accurately to the magnitude of the pressure differential between each gas inlet 28 and gas outlet 31 produced by the inclined position of the butterfly valve 25.

One of the advantages of the heat exchange unit shown is that the exhaust gas transfer passages are arranged in parallel so that, when exhaust gas is diverted therethrough, a relatively large area gas flow passage is provided which minimises the back pressure upstream from the exhaust gas heat exchanger 11.

When maximum heating of the coolant is required the butterfly valve 25 is moved to the full transfer position shown in FIG. 5 in which the butterfly valve 25 abuts against an inner wall of the cylindrical tube 15 and a cylindrical portion of the inlet 27. In this position substantially all of the exhaust gas entering the exhaust gas heat exchanger 11 through the inlet 27 as indicated by the arrow 'E' on FIG. 5 enters the gas inlets 28, as indicated by the arrow 'B' and passes through the exhaust gas transfer passages 30. Cylindrical body 26 is arranged to form an annular passage around the C-shaped heat exchange unit 11. This causes exhaust gas flow entering gas inlets 28 to split, such that part of the exhaust flow through the exhaust gas transfer passages 30 is directed against the flow of the coolant and part of the exhaust flow is directed with the flow of the coolant. The split exhaust gas flow then rejoins as it leaves the exhaust gas transfer passages 30 via the gas outlets 31, as indicated by the arrow 'D', and exits the exhaust heat exchanger 11 via the outlet of tube 15, as indicated by the arrow 'A' on FIG. 5.

It will therefore be appreciated that by varying the angle of rotation of the butterfly valve 25 a seamless and infinitely variable change in the proportion of exhaust gas being fed through the exhaust gas transfer passages 30 can be achieved.

Although the disclosure has been presented in relation to an embodiment using a C-shaped compact exhaust heat exchange unit, it will be appreciated that it could be applied to other types of heat exchange unit.

Furthermore, although an embodiment has been disclosed thus far, in which the exhaust gas heat exchanger 11 and the emission control device 12 are attached directly to one another to form a single combined emission control device and exhaust gas cooler assembly 10, it will be appreciated that the emission control device 12 and the exhaust gas heat exchanger 11 could be separate self contained units connected together by a conduit or pipe. In this case the exhaust gas heat exchanger 11 will be positioned downstream from the emission control device 12 and the inlet to the exhaust gas heat exchanger 11 will be connected to the outlet from the emission control device 12.

The design of the valve for the exhaust gas heat exchanger accounts for a large proportion of the overall cost of the device. The design described herein enables the valve spindle bearings to be kept cool using the coolant jacket at approximately 100° C. which results in a substantial cost saving over a design in which the bearings are specified to be leak free at 900° C. In addition, by using a butterfly valve, the actuation forces are dramatically lower than for a flap valve having a spindle at one edge because the exhaust gas forces that act against a top half of the butterfly valve are balanced to some degree by the forces that act against a lower half of the butterfly valve. This allows a lower power actuation system to be used which is both more compact and less expensive to produce.

Combining two heat exchangers in one unit greatly reduces cost and produces a unit that is easier to package on a motor vehicle. These advantages are further increased if the heat exchanger is also combined with an exhaust emission control device.

The location and design of the exhaust gas heat exchanger permits condensation to be more easily drawn off and greatly reduces the risk that any condensate will be transferred to the engine or other downstream components such as a turbocharger compressor. This is primarily due to the fact that the condensate is not forced to flow against the exhaust gas flow and also because gravity can be used to assist with drainage.

Therefore in summary, the disclosed engine uses a C-shaped heat exchanger to provide cooled exhaust gas for a low pressure EGR system while using the same heat exchanger to provide heat recuperation from the exhaust gas for use in heating a cabin of a motor vehicle by circulating the heated coolant of the exhaust gas heat exchanger through a cabin heater. This has the advantage of reducing the number of heat exchangers required by one while providing enhanced heater performance for the customer without the need for an electrical auxiliary heater.

When the coolant is cold and cabin heating is required, the butterfly valve is closed and exhaust gas is diverted through the heat exchanger transferring the available heat to the coolant for cabin heating. During this phase if the low pressure EGR system requires gas flow, the gas will be cooled by the cold coolant in heat exchanger before being drawn into the LPEGR system.

When the coolant is hot and no cabin heating is required the butterfly valve opens to prevent excessive heating of the coolant and because the entry and exits to the exhaust gas transfer passages are exposed to the exhaust gas, minimal heat exchange occurs due to the balanced pressure on the entry and exit to these exhaust gas transfer passages. During this phase if the LPEGR system starts to flow exhaust gas, it will be drawn in from both ends of the exhaust gas transfer passages due to the positioning of the tapping from the heat exchanger for the LPEGR system. This provides two parallel flow paths thereby providing the full heat exchanger capability of the exhaust gas heat exchanger.

Although the disclosure has been described with reference to a butterfly type valve that is used to control the flow through the heat exchanger, it will be appreciated that other types of valve could be used. For example, a flap valve could be used.

Figure 9:
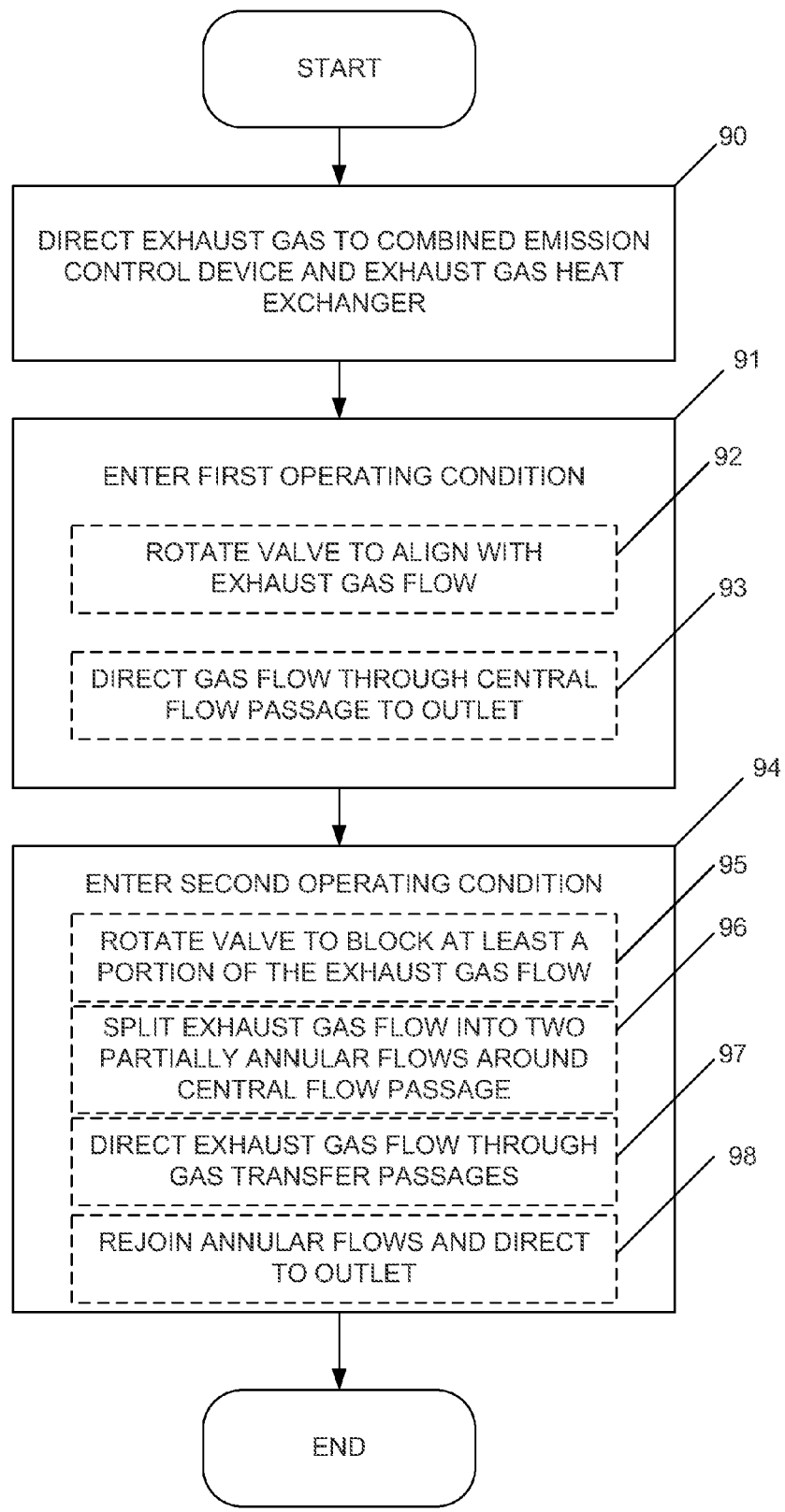
FIG. 9 shows an exemplary method of selectively cooling exhaust gas within the internal combustion engine depicted in FIG. 1.

FIG. 9 shows an exemplary method of selectively cooling an exhaust flow of the internal combustion engine of the present disclosure. At step 90, exhaust gas is directed from engine 5 to inlet 13 of combined emission control device and exhaust gas heat exchanger 10. During a first operating condition, as shown in step 91, valve 25 is rotated at step 92 to align with exhaust gas flow, as shown in FIG. 4. Valve 25 may be rotated by electronically controlled actuator 9, or alternatively using a wax based thermostatic control. At step 93, gas is directed to flow through the central flow passage of combined emission control device and exhaust gas heat exchanger 10 to outlet of tube 15. When, as shown in step 94, the engine 5 enters a second operating condition, valve 25 is rotated to block at least a portion of the exhaust gas flow in step 95, as shown in FIG. 5. The second operating condition may be a condition in which a cabin heater 2 is activated, indicating that heated air is desired within the passenger cabin of a vehicle. At step 96, the exhaust gas flow is split into two partially annular flows around the central flow passage. The split exhaust gas is directed through one or more gas transfer passages 30 in step 97, with one portion flowing against the flow direction of the coolant within coolant passages 32 and the other portion flowing with the flow direction of the coolant within coolant passages 32. Finally, the two annular flows are joined at step 98 and directed to outlet of tube 15.

Figure 10:
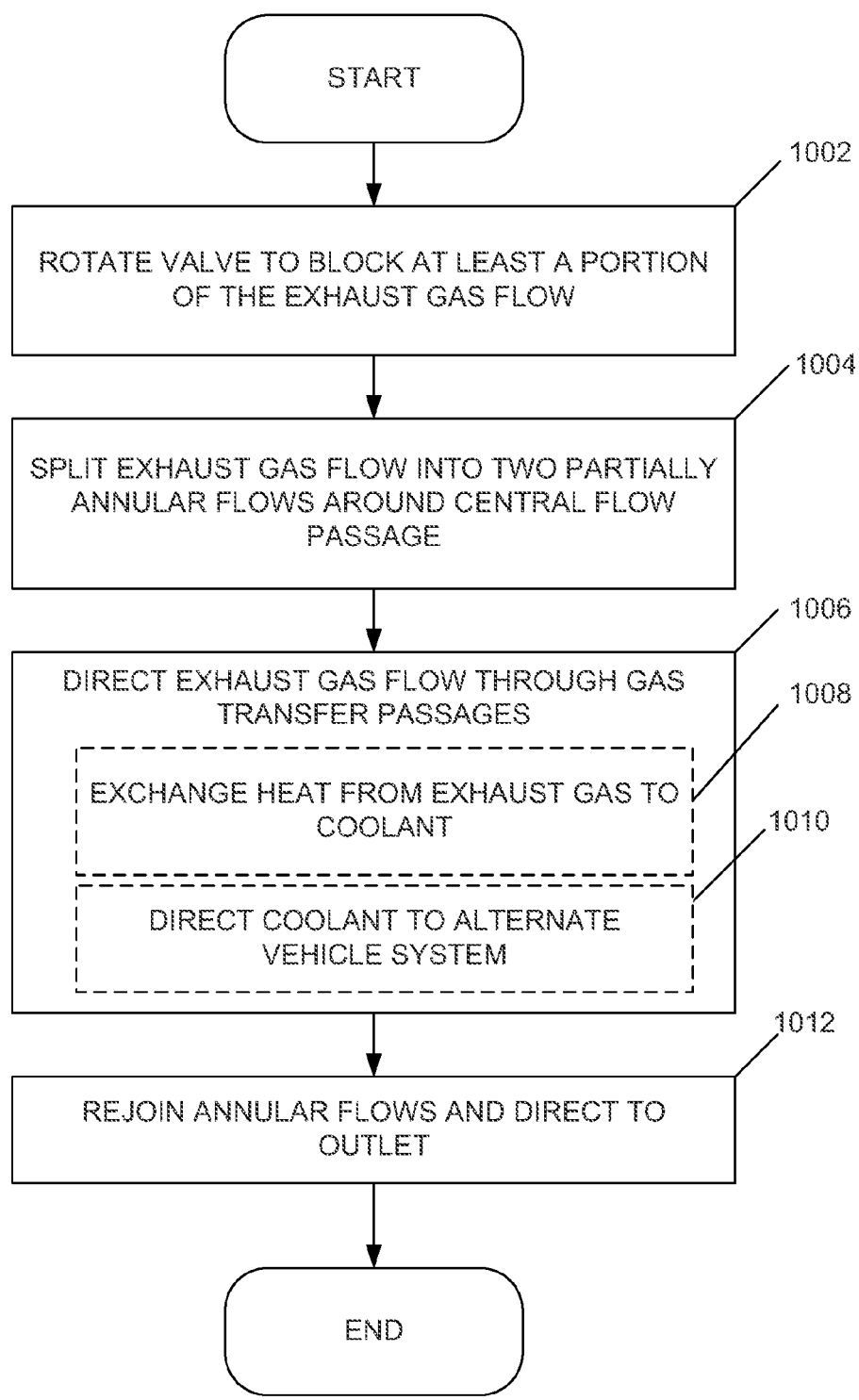
FIG. 10 shows a more detailed exemplary method of the second operating condition shown in FIG. 9.

FIG. 10 shows a more detailed exemplary method of the second operating condition shown in FIG. 9. Once again, at step 1002, valve 25 is rotated to block at least a portion of the exhaust gas flow, and at step 1004, the exhaust gas flow is split into two partially annular flows around a central flow passage. At step 1006, exhaust gas flow is directed through gas transfer passages 30, allowing, at step 1008, heat to be exchanged from the exhaust gas to the coolant within coolant passages 32. At step 1010, the coolant is then directed to an alternate vehicle system, for example, cabin heater 2. Finally, at step 1012, the partially annular exhaust gas flows are rejoined as they exit gas transfer passages 30 and directed to outlet of tube 15.

It will be appreciated by those skilled in the art that although the disclosure has been described by way of example with reference to one or more embodiments it is not limited to the disclosed embodiments and that modifications to the disclosed embodiments or alternative embodiments could be constructed without departing from the scope of the disclosure.

The invention claimed is:

1. An exhaust cooling method, comprising:
    rotating a valve of a combined emission device and exhaust heat exchanger to be aligned with exhaust flow, directing the flow through a central passage to an outlet of the heat exchanger; and
    rotating the valve to an inclined position, directing exhaust into the central passage and then through a heat exchanger transfer passage, an inlet and outlet of the transfer passage positioned at a same distance from an inlet of the heat exchanger, by splitting the flow into two partially annular flow passages around the central passage, before rejoining and directing the flow into the central passage and then to the outlet of the heat exchanger.

2. The method of claim 1 further comprising, during the blocking valve operation, exchanging heat from the exhaust to coolant flowing through at least one coolant flow passage of the heat exchanger, joining the split flow from the partially annular flow passages as the split flows exit the transfer passage into the central passage, and directing the joined exhaust flow to the outlet of the heat exchanger.

3. The method of claim 2 further comprising, during the blocking valve operation, directing coolant from the at least one coolant flow passage to a vehicle system.

4. The method of claim 3, wherein the blocking valve operation occurs while activating a cabin heater.

5. An exhaust cooling method, comprising:
    rotating a valve of a combined emission device and exhaust heat exchanger to be aligned with exhaust flow, directing the flow through a central passage to an outlet of the heat exchanger; and
    rotating the valve to block the central passage, directing exhaust through a heat exchanger transfer passage, an inlet and outlet of the transfer passage positioned at a same distance from an inlet of the heat exchanger, by splitting the flow into two partially annular flow passages around the central passage, before rejoining and directing the flow to the outlet of the heat exchanger,
    wherein the heat exchanger comprises a plurality of heat exchanger transfer passages, further comprising controlling an exhaust gas recirculation valve to supply exhaust gas from an exhaust gas tapping to a low pressure exhaust gas recirculation system, the exhaust gas tapping connected to at least one of the transfer passages and located mid-way between the inlet and outlet of each transfer passage to which it is connected.

6. The method of claim 5, further comprising collecting condensation produced in the heat exchanger in a condensate collection element coupled with the plurality of transfer passages.

7. An exhaust cooling method, comprising:
rotating a valve of a combined emission device and exhaust heat exchanger to be aligned with exhaust flow, directing the flow through a central passage to an outlet of the heat exchanger;
rotating the valve to block the central passage, directing exhaust through a heat exchanger transfer passage, an inlet and outlet of the transfer passage positioned at a same distance from an inlet of the heat exchanger, by splitting the flow into two partially annular flow passages around the central passage, before rejoining and directing the flow to the outlet of the heat exchanger; and
during the blocking valve operation, exchanging heat from the exhaust to coolant flowing through at least one coolant flow passage of the heat exchanger, joining the split flow from the partially annular flow passages as the split flows exit the transfer passage, and directing the joined exhaust flow to the outlet of heat exchanger,
wherein the heat exchanger comprises a plurality of transfer passages and a plurality of coolant flow passages arranged in parallel between the inlet and outlet of the heat exchanger, and wherein exchanging heat from the exhaust to coolant flowing through at least one coolant flow passage comprises directing exhaust through at least one transfer passage formed between two adjacent pairs of C-shaped plates while exchanging heat from the exhaust to coolant flowing through at least one coolant flow passage formed between a pair of the C-shaped plates.

8. The method of claim 7, wherein the C-shaped plates each have a front surface and a rear surface, each front surface having a depression forming an inner and outer circumferentially extending flange, each rear surface having a lip extending around an outer periphery of the plate, the plates attached in parallel in pairs such that each pair is joined along the flanges of the front surfaces and adjacent pairs are joined along the lips of the rear surfaces.

* * * * *